2,895,921
PREPARATION OF OXETANE POLYMERS

Charles C. Price, Lansdowne, Pa., assignor to Hercules Powder Company, Wilmington, Del., a corporation of Delaware No Drawing. Application August 27, 1956
Serial No. 606,217

10 Claims. (Cl. 260—2)

This invention relates to an improved method for the preparation of polymers of 3,3-disubstituted oxetanes, also known as 3,3-disubstituted oxacyclobutanes, and, more particularly, to the preparation of polymers of 3,3-bis(chloromethyl)oxetane.

It is known that certain oxetanes, namely, 3,3-disubstituted oxetanes and particularly 3,3-bis(chloromethyl)-oxetane may be polymerized to give high molecular weight polymers having a molecular weight of at least 10,000 and having physical properties which are highly desirable as applied to the broad field of use for such polymeric materials. However, heretofore, 3,3-bis(chloromethyl)oxetane has been polymerized using Friedel-Crafts catalysts, such as boron trifluoride etherate, aluminum chloride and others, at temperatures between —80° C. and 150° C. to obtain high molecular weight products. Under these conditions, it has been established and disclosed that the higher molecular weight products, suitable for plastics use, for example, were obtained only when the polymerization was carried out at room temperature or considerably below. Moreover, with use of the Friedel-Crafts catalysts, it has been established and disclosed that the amount of catalyst required is at a high level ranging between 0.1 and 10% and preferably above 1.0% by weight of the monomer. Needless to say, the requirement of such conditions has seriously detracted from the efficacy of the process and exploitation of its end products as well as imposing limitations in respect to versatility in end product application.

Now, in accordance with this invention, it has been discovered that the polymerization of 3,3-disubstituted oxetane may be carried out in the presence of aluminum alkoxide catalysts. Furthermore, it was discovered that high molecular weight polymers of 3,3-bis(chloromethyl)oxetane could be obtained under a considerable range of conditions and, more particularly, under conditions of elevated temperatures and extremely low catalyst levels. Moreover, it was found that the polymers were of better quality with respect to color, stability and level of impurities than those heretofore obtained and that the polymerization process in addition to being more economical afforded improved versatility for handling the products involved.

The following examples will serve to illustrate the preparation of polymers from monomers of 3,3-disubstituted oxetanes and particularly 3,3-bis(chloromethyl)-oxetane in accordance with this invention. All parts and percentages are by weight throughout the specification unless otherwise designated.

EXAMPLE 1

A solution of 0.2 part of aluminum isopropoxide in 300 parts of 3,3-bis(chloromethyl)oxetane was prepared by stirring at a temperature maintained between 100° to 120° C. for one hour under a blanket of nitrogen. This solution was polymerized, by slowly adding the mass to a reaction vessel provided with an agitator and the vessel was maintained at a temperature of about 198° C. The polymerization reaction was completed in about one-half hour giving a thick product. This product was cooled by quenching in water to give a solidified product which was then comminuted to pass a 20-mesh sieve. Residual monomer was then removed from the comminuted product by extraction with $CCl_4$. The specific viscosity at 50° C. of a 1% cyclohexanone solution of the polymer so produced was 1.99.

EXAMPLE 2

The procedure of Example 1 was repeated with the exception that 0.1 part of aluminum isopropoxide was used instead of 0.2 part. The specific viscosity at 50° C. of a 1% cyclohexanone solution of the polymer so produced was 2.98.

EXAMPLE 3

The procedure of Example 1 was repeated using the amount of catalyst set forth in Example 2 with the exception that the monomer contained 0.5% of 2,2'-methylene-bis(4-methyl-6-tert-butylphenol) as a stabilizing antioxidant. The specific viscosity at 50° C. of a 1% cyclohexanone solution of polymers so produced ranged between 1.0 to 1.3.

EXAMPLES 4–10

A series of polymerization reactions using various catalysts was conducted in accordance with this invention. These reactions were carried out by heating 13 parts of 3,3-bis(chloromethyl)oxetane monomer with catalyst in a closed reaction vessel containing an atmosphere of nitrogen. The catalysts, conditions of reaction, and character of end product are given in the following table.

Table
POLYMERIZATION OF 3,3-BIS(CHLOROMETHYL)OXETANE

| Example No. | Catalyst | Catalyst Concentration, p.p.m. by Wt. of Monomer | Reaction Time at 200° C., hrs. | Monomer Content, Percent [1] | Conversion, Percent [2] | Specific Viscosity [3] |
|---|---|---|---|---|---|---|
| 4 | $Al(OCH_5)_3$ | 925 | 3.5 | 40 | 60 | 0.59 |
| 5 | $Al(OC_2H_5)_3$ | 770 | 0.4 | 42 | 58 | 2.27 |
| 6 | $Al[OCH(CH)_3]_3$ | 1,570 | 0.25 | 4 | 96 | 1.01 |
| 7 | $Al[OCH_2CH(CH_3)_2]_3$ | 1,890 | 0.25 | 52 | 48 | 0.72 |
| 8 | $ClAl(OC_2H_5)_2$ | 3,400 | 2.0 | 14 | 86 | 0.30 |
| 9 | $(C_2H_5)_2AlOPeCl_3$ [4] | 1,280 | 0.25 | 17 | 83 | 0.65 |
| 10 | $[(CH_3)_2CHCH_2]_2AlOPeCl_3$ [4] | 1,530 | 0.25 | 15 | 85 | 0.46 |

[1] By near infrared analysis of the $CCl_4$ extract.
[2] 100 minus the monomer content determined as in footnote 1.
[3] Measured on the product after extraction with $CCl_4$. Specific viscosity of 1% solution of the polymer in cyclohexanone at 50° C.
[4] $OPeCl_3$ refers to the trichloropentaerythritol radical. The compounds were made by the reaction of trichloro-PE with aluminum trialkyl.

With reference to the above examples, it will be seen that this invention provides an expeditious method of polymerizing 3,3-disubstituted oxetanes at low catalyst level. Although it is not intended that the invention shall be limited to any particular theory of operation, it appears well established that the catalysis involved in accordance with this invention is radically different from the conventional Friedel-Crafts catalysis which heretofore has been utilized for the preparation of polyoxetanes and particularly 3,3-bis(chloromethyl)oxetane. This is evident since high polymerization temperatures with a low level of catalyst concentration may be used to obtain high molecular weight products.

Still further with reference to the above examples, it will be seen that distilled or purified 3,3-bis(chloromethyl)monomer, which may contain an antioxidant such as 2,2'-methylene-bis(4-methyl-6-tert-butylphenol), may be catalytically polymerized to a high molecular weight poly ether at elevated temperatures in the presence of aluminum alkoxide catalysts with the examples specifically demonstrating utility in respect to aluminum methoxide, aluminum ethoxide, aluminum isopropoxide, aluminum butoxide, aluminum diethoxychloride, diethyl aluminum pentaerythritol trichloride, and diisobutyl aluminum pentaerythritol trichloride. More particularly, the aluminum alkoxide catalysts within the purview of this invention have the general formula Al(X)(Y)(Z) wherein X is an alkoxyl group and Y and Z are members of the class consisting of alkyl, halogen, or alkoxyl. The hydrocarbon portion of the molecule may be straight chain, branched, alicyclic or aromatic. The hydrocarbon portion also may be substituted as in the general formula Al(RS)$_3$ wherein S may be halogen or alkoxyl. Although the lower aluminum alkoxides are preferred, that is, having not more than five carbon atoms in the (X) alkoxide group, higher aluminum alkoxides may be employed.

The amount of catalyst to be utilized based by weight of the monomer may be varied from about 10 to about 15,000 p.p.m. although no particular advantage accrues at the latter upper limit or even higher as heretofore explained in relation to the unique catalyst mechanism involved. Accordingly, it has been found that the amount of catalyst preferred for processing may be varied from about 30 to about 5,000 p.p.m. with the range from about 100 to about 1,000 p.p.m. preferred for production of high grade products and, particularly, for products to be utilized in association with electrical equipment.

The polymerization temperature in accordance with this invention may be varied over a wide range as, for example, from −20 to about 300° C. However, since polymerizations according to this invention may be carried out at elevated temperatures, a temperature range from about 75 to about 300° C. usually will be employed with temperatures from about 150 to about 250° C. highly preferable for general purpose utility including polymerizations in bulk or diluent systems as well as in situ polymerizations. The polymerization reaction may be carried out in either an open or closed vessel or the reaction may be carried out in atmospheric air where in situ polymerization is desired. The exclusion of excessive moisture is necessary but the presence of air may be tolerated. However, for the best polymer properties and polymerization performance anaerobic and anhydrous conditions are utilized. Under conditions where diluent polymerization reactions are desired, the diluents of utility are those that do not react either with the monomer or the catalyst. Such diluents include hydrocarbons such as heptane, decane or dodecane and halogenated hydrocarbons such as carbon tetrachloride, tetrachloroethane and trifluoro-1,1,2-tribromoethane. The polymerization reaction time may be varied over a wide range. In accordance with this invention, polymerization reactions have been carried out using various times between five minutes and several hours. No detrimental effects have been apparent under conditions where a prolonged reaction time is required or desired.

The high molecular weight polymers obtained in accordance with this invention may be separated from the polymerization reaction mass by standard procedures such as quenching the molten reaction mixture in a polymer nonsolvent such as methanol, water or carbon tetrachloride or the mass may be cooled, ground, and if necessary, washed. The percent of conversion may be considerably varied in accordance with this invention with conversions as high as 98% having been obtained. Moreover, the polymers obtained had specific viscosities, at 50° C. of a 1% cyclohexanone solution of the polymer, of between 0.3 and 4.0 and even greater thus showing that polymers having molecular weights in excess of 10,000 and much greater are obtainable. The desired specific viscosity of these polymers for general plastics use is in the order of 1.5–2.0 which is readily attainable by this invention.

From the foregoing, it is evident that there are numerous factors which will influence conditions for the most satisfactory operation of this invention, the actual requirements of which can be determined only by a detailed study of each set of starting materials and the intermediate and the finished products desired.

For example, although the invention has been particularly demonstrated for the preparation of 3,3-bis(chloromethyl)oxetane as the preferred material, other 3,3-disubstituted oxetanes such as 3,3-bis(fluoromethyl)oxetane, 3,3-bis(bromomethyl)oxetane, 3-chloromethyl-3-methyloxetane, 3,3-dimethyloxetane, and 3,3-bis(phenoxymethyl)oxetane may be similarly polymerized. Moreover, the properties of the end products may be modified by copolymerization of any of the above monomeric materials with each other or with other copolymerizable monomers such as oxetane, and other substituted oxetanes. Additionally, antioxidants, stabilizers, plasticizers and various other additives such as fillers, pigments, or other colorants may be incorporated with the polymers obtained in accordance with this invention. The specific materials utilized and their method of incorporation will, of course, depend on the intermediate and the finished products desired and, in general, additive incorporation may take place with the monomers, comonomers or prepolymers as well as the end product polymers.

The advantages of this invention over processes heretofore known in the art are multifold. The invention opens the way to a cheaper and more flexible process for preparing polymers of 3,3-disubstituted oxetanes and particularly those having molecular weights in excess of 10,000 which expressed in terms of specific viscosity as set forth herein means at least 0.3. Expensive refrigeration equipment for low temperature polymerization to obtain the high molecular weight polymers may be eliminated. In accordance with prior art procedures, bulk polymerizations were not feasible for lack of consistent control, whereas with this invention bulk polymerizations are entirely satisfactory. Furthermore, with the use of lower catalyst concentrations by factors of 10 to 1,000, the necessity for aftertreatment of the finished polymer to remove impurities is reduced to a minimum and for some end product applications may be eliminated entirely. The operability of the invention within a wide temperature range allows great flexibility in choosing operating conditions to get the most desirable polymer properties, to control the rate of the reaction, and to get the most economical operating conditions. Continuous polymerizations in extruders and of films on heated plates and belts have been attained. These procedures were impossible according to the processes heretofore known. Furthermore, the polymer obtained in accordance with this invention has better color, that is, it is whiter than polymer heretofore obtained by the prior art processes.

Additionally, the advantages of the invention in respect to flexibility is readily appreciated in considering its applicability as compared to the processes heretofore known. For example, polymerization in situ is now possible thereby opening a new field of application for these polymers. For such uses, the monomer-catalyst mixture may be prepared at room temperature. In coating wire, metal and other high temperature-resistant objects, the object to be coated is heated to a temperature in the order of 250° C., passed through a bath of the monomer-catalyst mixture and is removed therefrom with a thin film of polymer on the surface. In coating paper, fabric and other low temperature-resistant objects, the object is preferably coated with the monomer-catalyst mixture and then subjected to elevated temperature in a heat zone to complete polymerization. In preparing laminates, the materials are coated with the monomer-catalyst mixture, pressed and subjected to elevated temperature to complete polymerization. In potting compound applications, the monomer-catalyst mixture is poured into a mold and then subjected to elevated temperature to complete polymerization. While the foregoing exemplifies some of the applications where in situ polymerization may be employed with advantage, it is not intended to be all inclusive, but rather to emphasize some of the advantages over the solvent or dispersion coating systems and other conventional techniques heretofore available for these polymers.

Furthermore, the polymers produced in accordance with this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form countertops, industrial board and the like.

It will be seen, therefore, that this invention may be carried out by the use of various modifications and changes without departing from its spirit and scope.

What I claim and desire to protect by Letters Patent is:

1. In the method of polymerizing 3,3-disubstituted oxetane, of the group consisting of 3,3-bis(halomethyl)-oxetane, 3-chloromethyl-3-methyl oxetane, 3,3-dimethyl oxetane, and 3,3-bis(phenoxymethyl)oxetane the improvement which comprises polymerizing said oxetane in the presence of an aluminum alkoxide catalyst said catalyst being present in an amount sufficient to catalyze polymerization of said oxetane to a polymer having a molecular weight of at least 10,000.

2. In the method of polymerizing 3,3-bis(chloromethyl)oxetane, the improvement which comprises polymerizing said oxetane in the presence of an aluminum alkoxide catalyst, said catalyst being present in an amount sufficient to catalyze polymerization of said oxetane to a polymer having a molecular weight of at least 10,000.

3. In the method of polymerizing 3,3-bis(chloromethyl)oxetane to a polymer having a molecular weight of at least 10,000, the improvement which comprises subjecting 3,3-bis(chloromethyl)oxetane to a temperature from about 75 to about 300° C. in the presence of an amount of an aluminum alkoxide catalyst sufficient to catalyze polymerization of said oxetane to a polymer having a molecular weight of at least 10,000.

4. In the method of polymerizing 3,3-bis(chloromethyl)oxetane to a polymer having a molecular weight of at least 10,000, the improvement which comprises subjecting 3,3-bis(chloromethyl)oxetane to a temperature from about 75 to about 300° C. in the presence of an aluminum alkoxide catalyst, said catalyst being present in an amount of from about 30 to about 5,000 p.p.m. by weight of said oxetane.

5. In the method of polymerizing 3,3-bis(chloromethyl)oxetane to a polymer having a molecular weight of at least 10,000, the improvement which comprises subjecting 3,3-bis(chloromethyl)oxetane to a temperature from about 150 to about 250° C. in the presence of an aluminum alkoxide catalyst, said catalyst being present in an amount of from about 30 to about 5,000 p.p.m. by weight of said oxetane.

6. The method according to claim 5 in which the aluminum alkoxide catalyst is aluminum methoxide.

7. The method according to claim 5 in which the aluminum alkoxide catalyst is aluminum ethoxide.

8. The method according to claim 5 in which the aluminum alkoxide catalyst is aluminum isopropoxide.

9. The method according to claim 5 in which the aluminum alkoxide catalyst is aluminum butoxide.

10. The method according to claim 5 in which the aluminum alkoxide catalyst is aluminum diethoxychloride.

References Cited in the file of this patent

UNITED STATES PATENTS

| | | |
|---|---|---|
| 1,976,678 | Wittwer | Oct. 9, 1934 |
| 2,767,158 | Schlenker et al. | Oct. 16, 1956 |

OTHER REFERENCES

Farthing et al.: Jour. of Polymer Science, vol. 12, pp. 503–7 (1954).